United States Patent
Kawabe et al.

(10) Patent No.: US 9,064,526 B1
(45) Date of Patent: Jun. 23, 2015

(54) MAGNETIC DISK APPARATUS AND OFF-TRACK DETECTION METHOD

(71) Applicant: KABUSHIKI KAISHA TOSHIBA, Tokyo (JP)

(72) Inventors: Takayuki Kawabe, Kanagawa (JP); Takeyori Hara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/464,511

(22) Filed: Aug. 20, 2014

Related U.S. Application Data

(60) Provisional application No. 61/990,504, filed on May 8, 2014.

(51) Int. Cl.
*G11B 19/04* (2006.01)
*G11B 27/36* (2006.01)
*G11B 5/596* (2006.01)

(52) U.S. Cl.
CPC ............ *G11B 19/04* (2013.01); *G11B 5/59655* (2013.01); *G11B 27/36* (2013.01); *G11B 19/048* (2013.01)

(58) Field of Classification Search
None
See application file for complete search history.

(56) References Cited

U.S. PATENT DOCUMENTS

| 6,603,616 | B2 | 8/2003 | Takaoka | |
|---|---|---|---|---|
| 7,209,305 | B2 | 4/2007 | Chan et al. | |
| 8,027,113 | B2* | 9/2011 | Zaitsu | 360/46 |
| 8,873,190 | B1* | 10/2014 | Christdhas | 360/75 |
| 2007/0242386 | A1* | 10/2007 | Finamore et al. | 360/75 |

FOREIGN PATENT DOCUMENTS

JP  2002-032971  1/2002

* cited by examiner

*Primary Examiner* — Andrew L Sniezek
(74) *Attorney, Agent, or Firm* — Knobbe Martens Olson & Bear LLP

(57) ABSTRACT

In a disk drive apparatus, there is provided with a controller which determines a demodulated positioning error from a demodulated position and a target position, wherein the demodulated position is obtained by demodulating a servo signal readout from the disk. The controller estimates a demodulation noise amount which is included in the demodulated position on the basis of a signal quality of the servo signal, and corrects a predetermined off-track threshold with a correction value which is obtained from the estimated demodulation noise amount. A write operation of writing data on the disk is inhibited, if the demodulated positioning error exceeds the corrected off-track threshold.

14 Claims, 8 Drawing Sheets

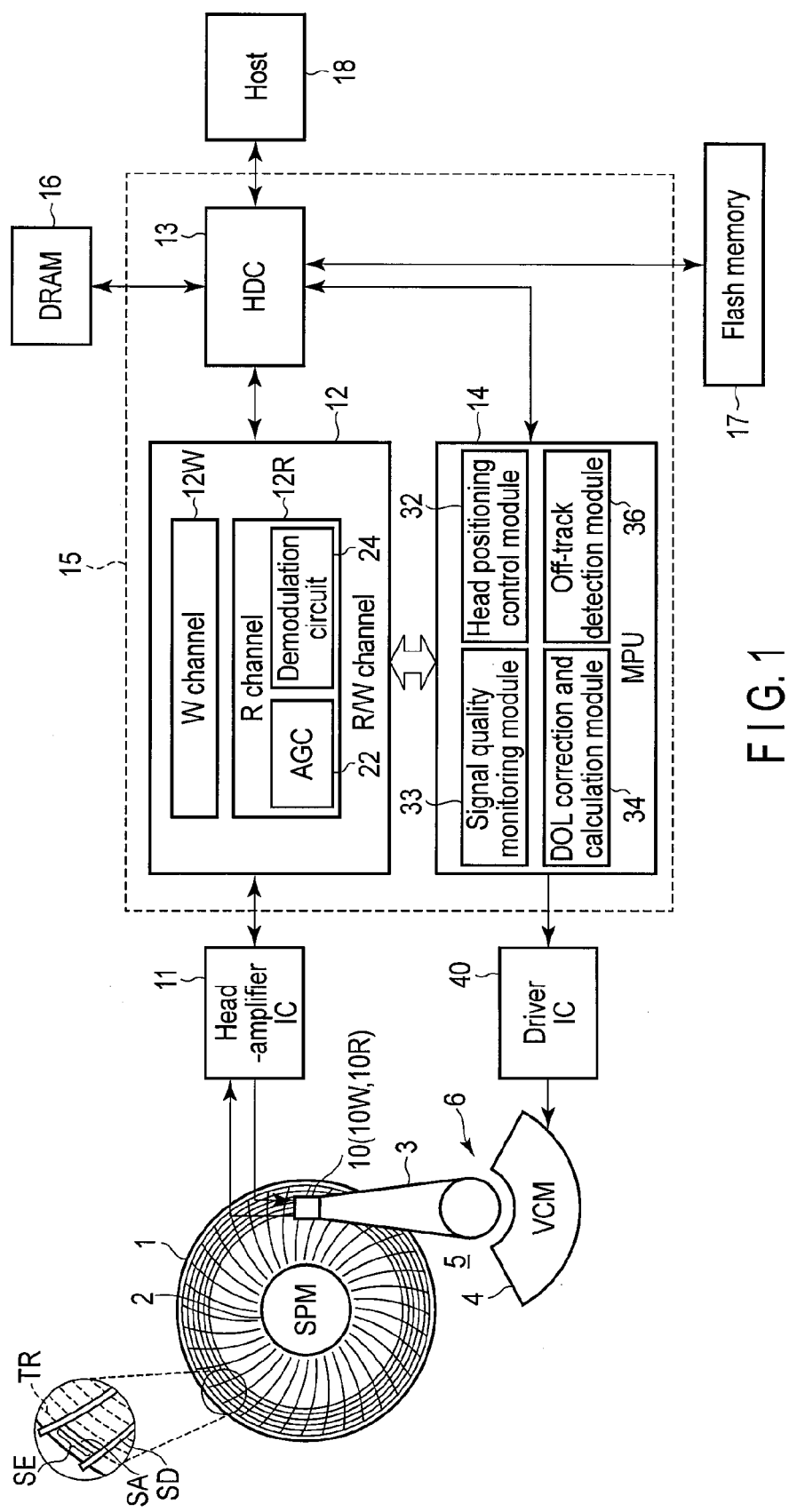
F I G. 1

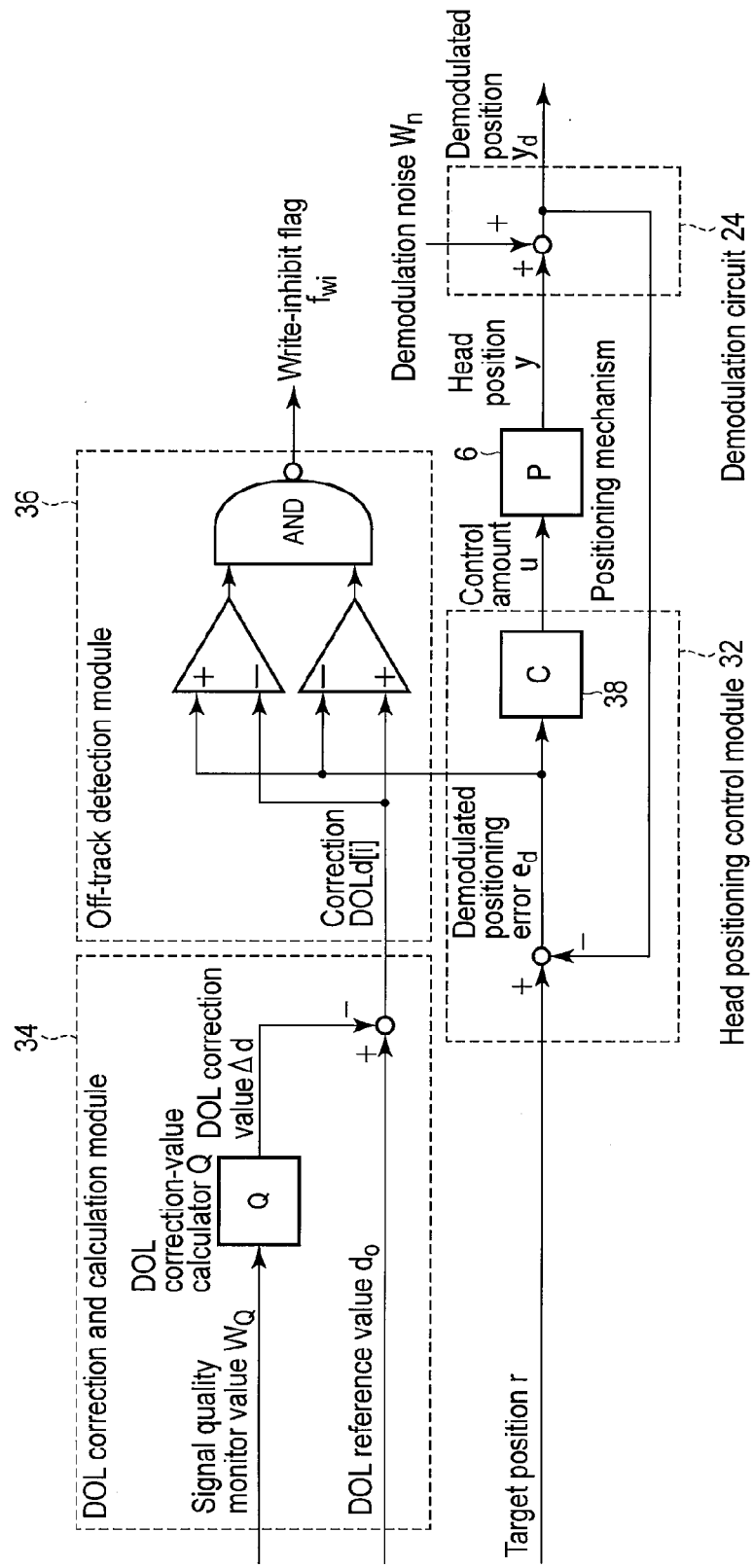
F I G. 2

MAGNETIC DISK APPARATUS AND OFF-TRACK DETECTION METHOD

CROSS-REFERENCE TO RELATED APPLICATIONS

This application claims the benefit of U.S. Provisional Application No. 61/990,504, filed May 8, 2014, the entire contents of which are incorporated herein by reference.

FIELD

Embodiments described herein relate generally to a magnetic disk apparatus and an off-track detection method.

BACKGROUND

In recent years, a higher recording density of a storage medium such as a magnetic disk has been promoted in the field of a disk storage apparatus such as a hard disk drive (hereinafter, referred to simply as a disk drive). In the disk drive, a large number of cylinders (tracks) are arranged in a radial direction on the disk, the cylinder comprising a servo area (hereinafter, referred to as a servo sector) in which servo information is recorded. The servo information is used to detect a position of a head over the disk, and includes a preamble in which address data including a cylinder number and a servo sector number is recorded and a burst.

In the magnetic disk apparatus, a magnetic head is positioned on a target track on the basis of read servo information. However, as storage media come to have higher densities, the proportion of noise components in a servo signal tends to be relatively increased because of floating fluctuations, etc of the magnetic head. In control of off-track detection of a magnetic disk apparatus, these noise components cause a demodulation error of a position error signal (PES) to be demodulated. Also, due to a demodulation error of a position error signal (PES), it may be often occurred that the off-tracking of the head cannot be correctly detected. As a result, the risk of adjacent data being deleted when user data is written has been increasing.

BRIEF DESCRIPTION OF THE DRAWINGS

FIG. 1 is a block diagram schematically showing configuration of a magnetic disk apparatus according to an embodiment;

FIG. 2 is a block diagram showing configuration of a head positioning control module and an off-track detection module in the magnetic disk apparatus shown in FIG. 1;

DETAILED DESCRIPTION

Figure 3:
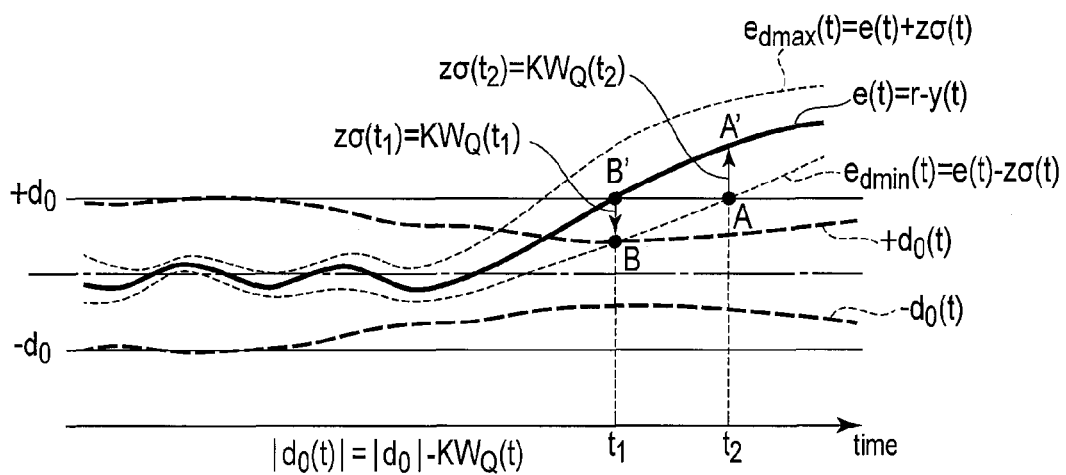
FIG. 3 is a waveform chart showing a position error signal e(t) and an off-track threshold $d_0$ which change as time passes in control by the head positioning control module and the off-track detection module shown in FIG. 2.

Magnetic disk apparatuses according to various embodiments will be described hereinafter with reference to the accompanying drawings.

A disk drive apparatus according to an embodiment comprises a disk having a disk surface, a head movable over the disk surface to write data on the disk, a head positioning mechanism configured to control a position of the head over the disk surface; and a controller configured to control the head positioning mechanism to determine a demodulated positioning error from a demodulated position and a target position, the demodulated position being obtained by demodulating a servo signal readout from the disk, wherein the controller is configured to estimate a demodulation noise amount included in the demodulated position on the basis of a signal quality of the servo signal, correct a predetermined off-track threshold with a correction value which is obtained from the estimated demodulation noise amount, and inhibit a write operation of writing data on the disk if the demodulated positioning error exceeds the corrected off-track threshold.

FIG. 1 schematically shows configuration of a disk storage apparatus (disk drive) according to an embodiment.

The disk drive comprises a head-disk assembly (HDA) 5, a head-amplifier integrated circuit (hereinafter, a head-amplifier IC) 11 and a system controller 15 constituted of a single-chip integrated circuit.

The HDA 5 comprises a storage medium such as a magnetic disk 1, a spindle motor (SPM) 2, an arm 3 equipped with a head 10, and a voice coil motor (VCM) 4. The disk 1 is rotated by the spindle motor 2, the voice coil motor (VCM) 4 swings the arm 3 to move the head 10 to a target position r on a surface of the disk 1.

In the HDA 5, the head 10 reads data from an area on the magnetic disk 1, and writes data to an area on the magnetic disk 1. As is well known, on the magnetic disk 1, a cylinder (track) TR in which data is recorded is provided in a concentric circle, and a servo data area SD is recorded along a substantially radial direction so as to separate the cylinder TR into sectors SE along a circumferential direction. An area of a sector SE between servo data areas SD is defined in a user area UA in which a user can records data. In the servo data area SD, servo data for reading and writing data is recorded. In the servo data, a servo AGC, a servo mark, and a servo address including track address data and sector address data are recorded as a preamble, and a burst is recorded following the preamble.

The carriage arm 3 and the VCM 4 constitute an actuator as a head positioning mechanism 6 configured to position the head 10. The actuator controls the movement of the head 10, which is equipped on the arm 3, to a target position r on the disk 1 by driving the VCM 4. More specifically, as will be described later, the actuator is driven by a control signal having control amount u from a head positioning control module 32 so that the head 10 is moved over the disk 1 in accordance with a control amount u. Thus, the head 10 is positioned at a head position y, data is read from the disk 1, and also, data is written to the disk 1.

The head 10 is constituted of a write head 10W and a read head 10R mounted on a slider. The read head 10R reads data recorded in the disk 1, and the write head 10W writes data to the disk 1.

The head-amplifier IC 11 comprises a read amplifier and a write driver. The read amplifier amplifies a read signal read by the read head 10R and transmits it to a read/write (R/W) channel 12. On the other hand, the write driver transmits a write current according to write data output from the R/W channel 12 to the write head 10W. Also, a driver IC 40 supplies a drive current corresponding to the control amount u to the VCM 4, and thus, the VCM 4 is driven and the arm is oscillated, and the head 10 is moved to the target position r on the disk 1.

The system controller 15 comprises the R/W channel 12 including an R channel 12R and a W channel 12W. Also, the system controller 15 comprises a hard disk controller (HDC) 13 and a microprocessor (MPU) 14. The write channel 12W performs signal processing of write data. Also, the read channel 12R processes a read signal read from a track and performs a data reproduction operation of decoding data from the read signal. Here, the read channel 12R comprises an automatic gain control (AGC) 22 comprising a variable gain amplifier (VGA) configured to variably set the gain, amplifies a read signal with an amplification gain given from the AGC 22, and supplies it to a demodulation circuit 24, which will be described later.

In the read channel 12R, a read signal is given to the AGC 22, a servo AGC included in the read signal is detected, and an amplification gain is determined. A servo address and a burst are amplified with the amplification gain, and are supplied to the demodulation circuit 24. Here, an amplification gain determined in the AGC 22 is stored in a register, and a value of the amplification gain is read from the MPU 14 and is converted into a signal quality monitor value $w_Q$. The signal quality monitor value $w_Q$ is an index value for evaluating a signal quality. From a read signal, in the demodulation circuit 24, a servo address signal is demodulated (decoded), and a demodulated position signal $y_d$ is output from a burst.

The MPU 14, as firmware, comprises the head positioning control module 32, a signal quality monitoring module 33, a drift-off level (DOL) correction and calculation module 34, and an off-track detection module 36. Here, in the head positioning control module 32, a head positioning controller (C) 38 determines a control amount u on the basis of a demodulated positioning error $e_d$ calculated as a position error signal (PES), the head positioning mechanism (P) 6 is controlled with the control amount u, and the head 10 is positioned at a target position. A demodulated positioning error $e_d$ is calculated as a difference between a demodulated position $y_d$ and a target position r.

Also, the DOL correction and calculation module 34 corrects and calculates a DOL reference value $d_0$ which is predetermined depending on a signal quality monitor value $w_Q$.

Here, a drift-off level (DOL) reference value $d_0$ corresponds to an off-track (also referred to as drift-off) threshold. Usually, if a demodulated positioning error $e_d$ exceeds the range of the reference value $d_0$, it is determined that an off-track (drift-off) condition has occurred. In the embodiment, the DOL reference value $d_0$ is corrected in the DOL correction and calculation module 34. Also, a signal quality monitor value $w_Q$ has a correlation with an amplification gain VGAS determined in the AGC 22, and is calculated on the basis of the amplification gain VGAS in the signal quality monitoring module 33. The off-track detection module 36 determines whether the absolute value of a demodulated positioning error $e_d$ falls within the range of a DOL value d corrected in the DOL correction and calculation module 34. When the absolute value of a demodulated positioning error $e_d$ reaches outside the range of a corrected DOL value d, or when it may reach outside the range of a corrected second DOL value $d_1$ as time passes, a write-inhibit flag is output. The write-inhibit flag is given from the MPU 14 to the W channel 12W, and the output of write data is inhibited in the W channel 12W. Thus, the supply of a write current from the head-amplifier 11 to the write head 10W is stopped.

Also, the HDC 13 controls data transfer between a host 18 and the R/W channel 12. The HDC 13 performs data transfer control by controlling a buffer memory (for example, a dynamic random access memory [DRAM]) 16 and temporarily storing read data and write data in the buffer memory 16. In addition, the HDC 13 controls a flash memory 17 and, for example, uses it as a firmware storage area of a program, an apparatus parameter, and the like. The MPU 14 is a main controller of a disk drive, and performs servo control of controlling the VCM 4 and positioning the head 10. Moreover, the MPU 14 controls recording and reproduction of data through the R/W channel 12.

As shown in FIG. 2, a head positioning servo system and a write-inhibit control system are constituted of the head positioning control module 32 configured to control the head positioning mechanism 6 for positioning the head 10, the off-track detection module 36 configured to detect an off-track condition and to output a write-inhibit flag, and the DOL correction and calculation module 34 configured to correct a DOL reference value $d_0$ of an off-track reference level, which are shown in FIG. 1.

In the servo system, when the magnetic head 10 is located at a position y on a magnetic disk by the head positioning mechanism (P) 6, the reproduction magnetic head 10R reads servo information (servo address and burst) which is previously written on the magnetic disk 1. The reproduction signal is supplied to the demodulation circuit 24 and is demodulated into a servo address, and also, a demodulated position $y_d$ is output from the demodulation circuit 24 on the basis of a signal corresponding to a burst included in the reproduction signal. At this time, the demodulated position $y_d$ corresponds to a value obtained by adding demodulation noise $w_n$ to an actual magnetic head position y.

A positioning target position r for the magnetic head 10 is read from the disk 1 through the magnetic head 10R to the MPU 14, and is supplied to the head positioning control module 32. In the head positioning control module 32, a difference between the positioning target position r and a demodulated position $y_d$ is calculated as a demodulated positioning error $e_d$. In the servo system shown in FIG. 2, such a control amount u as makes the demodulated positioning error $e_d$ zero is output from the positioning controller (C) 38. Thus, the servo system constitutes a feedback control system.

To the off-track detection module 36 in the write-inhibit control system, a demodulated positioning error $e_d$ is input, and is compared with a correction DOL value d[i] obtained by correcting a DOL (drift-off level) reference value $d_0$. In the off-track detection module 36, if it is determined that the absolute value of a demodulated positioning error $e_d$ exceeds a correction DOL value d[i], a write-inhibit flag $f_{wi}$ is asserted, and if writing is being done, write-inhibit processing is carried out. Also, even in the case in which a demodulated positioning error $e_d$[i] at a present sampling timing does not exceed a correction DOL value d[i], if it is expected that a positioning error $e_d$[i+1] at a next sampling timing will unacceptably exceed a correction DOL value d[i], a write-inhibit flag $f_{wi}$ may be asserted, and if writing is being done, write-inhibit processing may be carried out.

More specifically, if a head position y is output from the positioning mechanism (P) 6, when the head approaches an adjacent track or is expected to approach the adjacent track during a write operation, a write-inhibit flag $f_{wi}$ is set in response to detecting the approach to the adjacent track or expecting the approach to the adjacent track, and the write operation is stopped. By the write-inhibit flag $f_{wi}$, a write operation in an off-track condition is inhibited, and a decline in a reproduction error rate in a track of a present writing target (referred to as one's own track) and an adjacent track can be prevented.

Here, a positioning error signal $e_d$ as a monitor signal of off-track detection includes demodulation noise $w_n$ as represented by the equation (1) below, and thus, a case occurs where correct off-track detection is not carried out.

$$e_d(t)=r-y_d=r-(y+w_n) \quad (1)$$

If the demodulation noise $w_n$ is large, the probability (signal quality) of a demodulated value declines and off-track detection may not be carried out. However, in the correction and calculation module 34 shown in FIG. 2, a DOL reference value as an off-track threshold at which an off-track condition of a head is detected is cut down by a demodulation error, and a threshold is substantially updated. Thus, as will be described later with reference to FIG. 3 and FIG. 4, an off-track detection delay caused by a demodulation error can be prevented. Here, because a signal quality monitor value $w_Q$ has a correlation with an amplification gain VGAS determined in the AGC 22, a signal quality monitor value $w_Q$ is determined by calculation on the basis of the amplification gain VGAS in the signal quality monitoring module 33 of the MPU 14.

To promote an understanding of a function of the DOL correction and calculation module 34, a servo circuit according to a comparison example in which the DOL correction and the calculation module 34 and the signal quality monitoring module 33 are not provided, and its operation will be described. In the servo circuit according to the comparison example, a fixed DOL (drift-off level) reference value $d_0$, which is predetermined, is input to the off-track detection module 36, and the drift level reference value $d_0$ is compared with a demodulated positioning error $e_d$. A real positioning error e(t) fluctuates with time as indicated by a solid line in FIG. 3, and a demodulated positioning error $e_d$(t) is actually detected by adding demodulation noise $w_n$ to the demodulated positioning error $e_d$. Thus, a demodulated positioning error $e_d$(t) has a probabilistic width for a real positioning error e(t) as indicated by broken lines.

Here,
a demodulated positioning error $e_d$(t) is represented by:

$$e_d(t)=r-(y(t)+w_n(t)), \quad (1)$$

and a real positioning error e(t) is represented by:

$$e(t)=r-y(t). \quad (2)$$

Here, if it is considered that an expected value of a demodulated positioning error $e_d$(t) is a real positioning error e(t) and its standard deviation is σ(t), an estimated maximum deviation can be represented by its proportional times (referred to as an estimated gain z), a demodulated positioning error $e_d$(t) fluctuates within the range of a maximum value $e_{dmax}$(t) ($e_{dmax}$(t)=e(t)+zσ(t)) and a minimum value $e_{dmin}$(t)($e_{dmin}$(t)= e(t)−zσ(t)) in FIG. 3. In FIG. 3, +$d_0$ and −$d_0$ represent a fixed off-track threshold (hereinafter, referred to simply as a threshold), and if the absolute value of a demodulated positioning error $e_d$ exceeds $d_0$, it is determined that an off-track condition arises.

Because a point B' at a certain point of time t1 shown in FIG. 3 is on a real positioning error e(t) indicated by the solid line and e(t) is greater than or equal to +$d_0$ (e(t)≥+$d_0$), an off-track condition arises. However, if an observable demodulated positioning error $e_d$ is a minimum value $e_{dmin}$ under the influence of demodulation noise $w_n$, a demodulated value $e_{dmin}$ at this point of time is a point B, which does not exceed a threshold $d_0$, and an off-track condition does not arise.

Also, a point A at a time (t2), where a demodulated positioning error $e_{dmin}$(t) may exceed a threshold +$d_0$, is not located on a real demodulated positioning error e(t) indicated by the solid line, and should be changed to a point A' at the time (t2), where the threshold +$d_0$ is already exceeded. Thus, if a write operation is stopped when the head is reached to the point A', the write operation is performed in an off-track condition until being stopped.

Figure 5:
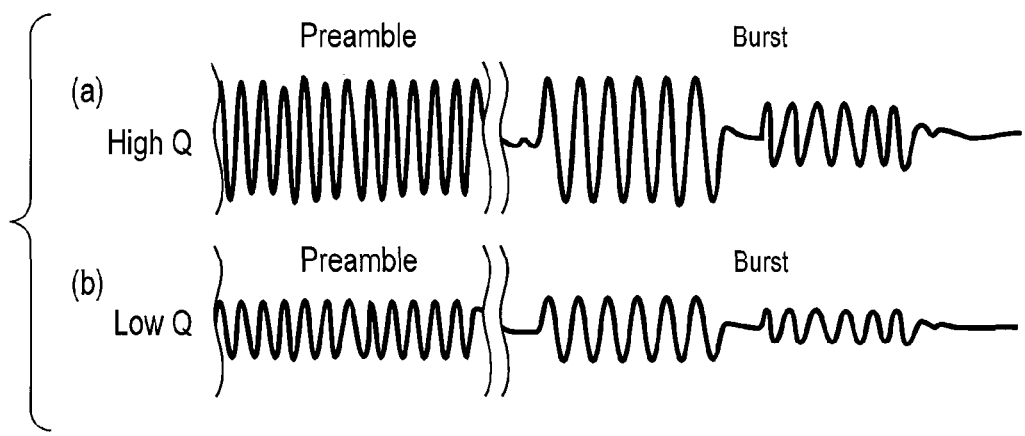
FIG. 5 is a waveform chart schematically showing a servo signal read by a magnetic head in the magnetic disk apparatus shown in FIG. 1.

To correctly detect an off-track condition, it is necessary to identify demodulation noise $w_n$ correctly. FIG. 5 is a waveform chart schematically showing a servo signal readout from the magnetic head. FIG. 5 (a), high Q, shows a waveform chart of a servo signal having a good signal quality, and FIG. 5 (b), low Q, is a waveform chart of a servo signal having a declining signal quality.

Because a positioning error of the magnetic head 10 is based mainly on an amplitude of a burst reproduction signal Burst included in a reproduction signal, a signal quality in this area directly affects demodulation noise $w_n$. Because the number of cycles is small in an area of a burst reproduction signal, and also because the amplitude fluctuates according to the head position, it is hard to monitor a signal quality directly from a burst reproduction signal. However, if reproduction information of a preamble area which is disposed in a servo area of the same reproduction signal and is used for clock synchronization is used, it becomes possible to monitor a servo signal quality.

In general, because a signal (high Q) of a high signal quality shown in FIG. 5 (a) has a high signal amplitude and relatively low noise, a variable gain amplification (VGA) adjustment value (VGAS) is adjusted low, wherein the variable gain amplification VGA adjustment value (VGAS) has a standardization function of an AGC in an input stage of a circuit configured to read this signal. Because a signal (low Q) of a low quality shown in FIG. 5 (b) has a low signal amplitude and relatively high noise, an adjustment value VGAS is adjusted high. Thus, if a variable gain adjustment gain value VGAS becomes high, it can be considered that the signal quality has decreased.

Figure 6:
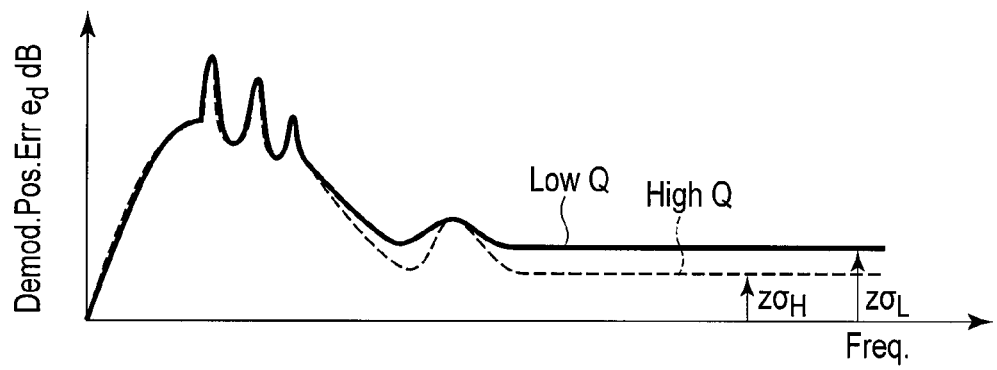
FIG. 6 is a graph showing a power spectrum obtained by removing a rotation synchronization component from a demodulated positioning error $e_d$ and further performing a Fourier transform in the magnetic disk apparatus shown in FIG. 1.

FIG. 6 is an explanatory diagram showing the relationship between positioning accuracy and signal quality, and shows a power spectrum obtained by removing a rotation synchronization component from a demodulated positioning error $e_d$ and performing a Fourier transform. A real positioning error e, a mechanical disturbance component of which is suppressed by a positioning control mechanism, appears in a low-frequency area in the power spectrum shown in FIG. 6. Also, in a high-frequency area in the power spectrum, because a mechanism portion cannot track a target in a frequency band of the mechanism portion, a noise component which has no correlation with a real positioning error e is dominant, and characteristics are substantially flat. In comparison with that in a good system (high Q) of a signal quality, the noise component $w_n$ is large in a bad system (low Q). Because it can be supposed that a noise component $w_n$ is probabilistic white Gaussian, it can be represented as proportional times $z\sigma_H$ and $z\sigma_L$ of a standard deviation of variance $\sigma_H^2$ and $\sigma_L^2$ ($\sigma_H^2 < \sigma_L^2$) with an expected value of a real positioning error e. Here, z is an estimated gain determined by a servo sampling frequency and an assumed probability.

Figure 7:
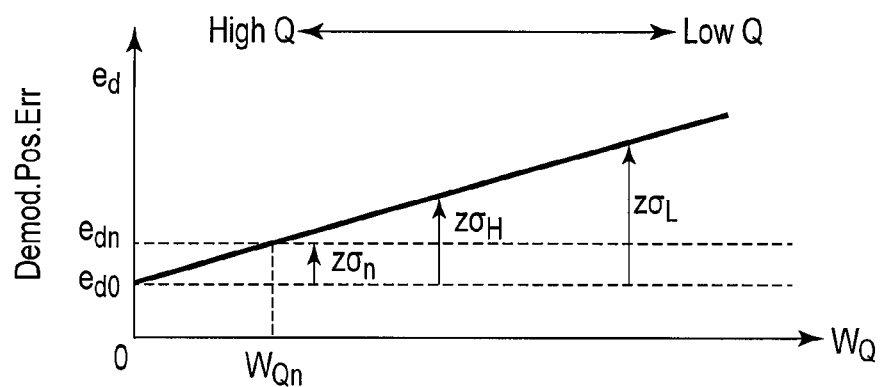
FIG. 7 is a graph showing relationship between the signal quality monitor value $w_Q$ of the servo signal and the demodulated positioning error $e_d$ in the magnetic disk apparatus shown in FIG. 1.

FIG. 7 shows the relationship between a signal quality monitor value $w_Q$ of a servo signal and an observable demodulated positioning error $e_d$. As indicated by a solid line in FIG. 7, a demodulated positioning error $e_d$ is a value obtained by adding or subtracting a demodulation noise component $z\sigma$ ($w_Q$), which is a function of a signal quality monitor value $w_Q$, to or from a real positioning error $e_{d0}$ (=e(t)) for which a demodulation noise component is made zero. Thus, by numerical calculation or approximate tabulation of a function of the demodulation noise component $z\sigma$ ($w_Q$), a noise component $z\sigma$, which is to be included in a demodulated positioning error $e_d$ according to a signal quality (high Q, low Q), can be identified.

Figure 4:
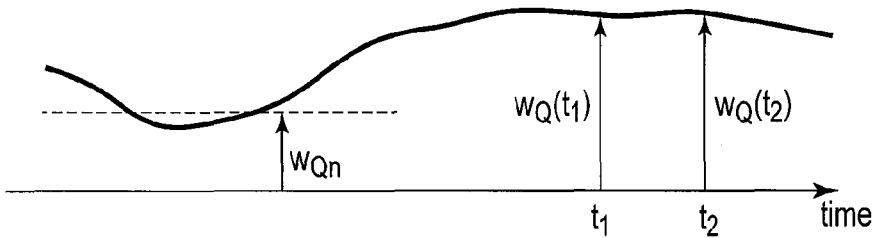
FIG. 4 is a graph showing a signal quality monitor value $w_Q$ which changes with the position error signal e(t) shown in FIG. 3.

In the servo system, to which the DOL correction and calculation module 34 is added, according to a signal quality monitor value $w_Q$ changing as time passes, which is shown in FIG. 4, a threshold $\pm d_0(t)$ is corrected such that:

$$|d_0(t)| = |d_0| - K \cdot w_Q(t), \quad (3)$$

where K is the proportionality constant. In off-track detection with respect to the corrected threshold $\pm d_0(t)$, detection is done at a point B instead of a point B'. In FIG. 3, a line width of a corrected threshold $\pm d_0(t)$, which fluctuates with time, is indicated by thick broken lines. A real positioning error e(t1) in the off-track detection is at the point B', and is at a position where an off-track condition is detected based on a normal threshold $d_0$. Thus, because a threshold $\pm d_0(t)$ is determined according to a signal quality monitor value $w_Q$ in this manner, a real positioning error e(t) can be prevented from exceeding an off-track threshold $d_0$ even if there is demodulation noise $w_n$ which correlates with a signal quality.

Figure 8:
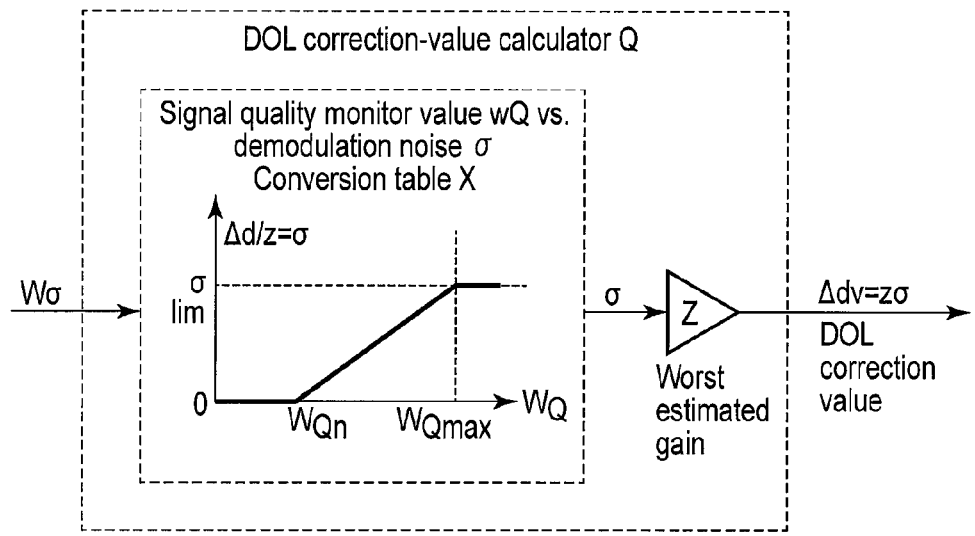
FIG. 8 is a block diagram showing an example of a drift-off level (DOL) correction and calculation module shown in FIG. 1.

In the present embodiment, the DOL correction and calculation module 34 comprises a DOL correction-value calculator Q configured to calculate a DOL correction value $\Delta d$ from a signal quality monitor value $w_Q$. As shown in FIG. 8, the correction-value calculator Q is constituted of a conversion table with which a DOL correction value $\Delta d$ is calculated by multiplying a signal quality monitor value $w_Q$ by a fixed gain K or a filter constant. Here, a signal quality monitor value $w_Q$ corresponds to a value of an AGC adjustment gain value VGAS in the read channel 10R for maintaining a constant servo preamble signal amplitude. Also, a conversion table X is set such that a deterioration component $\Delta w_Q$ ($\Delta w_Q = w_Q - w_Q(\text{nom})$) for a normal signal quality monitor value $w_Q(\text{nom})$ is substantially directly proportional to a standard deviation $\sigma$ of demodulation noise. Thus, if a signal quality monitor value $w_Q$ having a correlation with a standard deviation $\sigma$ of demodulation noise is input to the conversion table X, $\sigma$ is determined. However, o is set to amount to a constant value $\sigma$lim when a signal quality monitor value $w_Q$ declines and reaches a certain signal quality $w_{Qmax}$.

When a standard deviation $\sigma$ of demodulation noise is determined with the conversion table X, a DOL correction value $\Delta d$ ($\Delta d = z\sigma$) is determined by multiplication by a gain z for estimating a worst value of $\sigma$. Here, an estimated gain z for which the worst is assumed is determined with respect to a case in which a demodulation error amounts to a worst value. As shown in FIG. 2, the DOL correction value $\Delta d$ is subtracted from a DOL reference value $d_0$, and a corrected DOL value d ($d = d_0 + \Delta d$) is calculated. The corrected DOL value d is supplied to the off-track detection module and is compared with a demodulated positioning error $e_d$, and off-track detection is performed.

Figure 9:
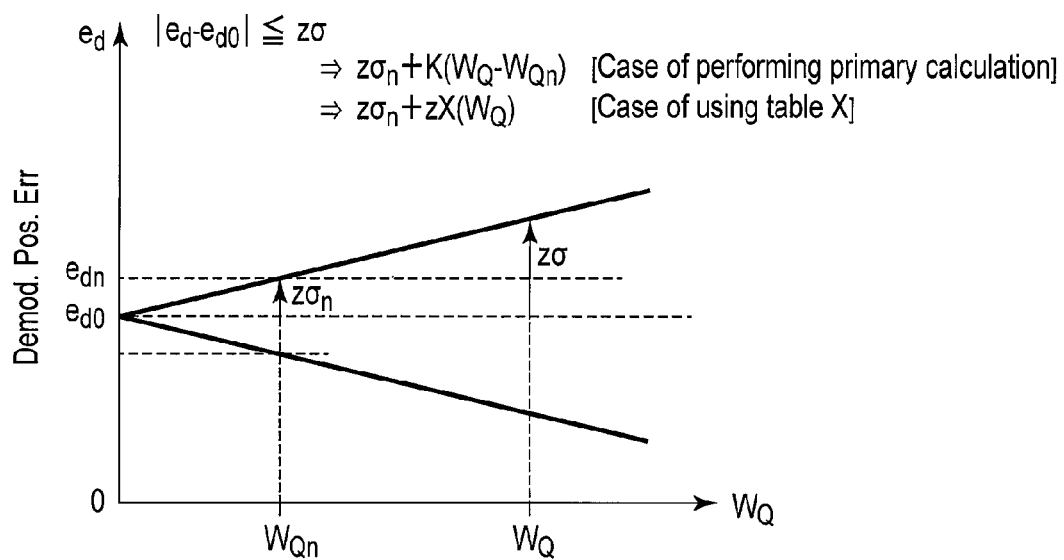
FIG. 9 is a graph showing relationship between the signal quality monitor value $w_Q$ and the demodulated positioning error signal $e_d$ in the magnetic disk apparatus shown in FIG. 1.

Also, the conversion table X may be constituted of a calculator configured to determine a standard deviation $\sigma$ of demodulation noise by performing a proportional calculation for a signal quality monitor value $w_Q$. As shown in FIG. 9, in the case of performing a proportional calculation, a correction value $z\sigma$ is determined by $[z\sigma = z\sigma_n + (w_Q - w_{Qn})]$.

Further, as shown in FIG. 8, the conversion table X may be constituted of a table in which a standard deviation $\sigma$ of demodulation noise having a correlation with a value of a signal quality monitor value $w_Q$ is output. In the case of using the conversion table X, a correction value $z\sigma$ is determined by $[z\sigma = z\sigma_n + zX(w_Q)]$. Moreover, a DOL correction value $\Delta d$ may be tabulated by directly extracting a demodulation noise amount obtained from a high-frequency area component at a demodulated position as shown in FIG. 6 at the time of a shipping test, without inputting a signal quality monitor value $w_Q$. Furthermore, in this table, as a DOL correction value $\Delta d$ determined per head zone, a DOL correction value $\Delta d$ may be read every time the head 10 is switched from a zone to another zone. Here, each zone is constituted of a plurality of tracks in a predetermined area which are successively arranged in a radial direction, and if there is a target track in these tracks, the same DOL correction value $\Delta d$ is applied and a threshold which is a DOL reference value is corrected.

Figure 10:
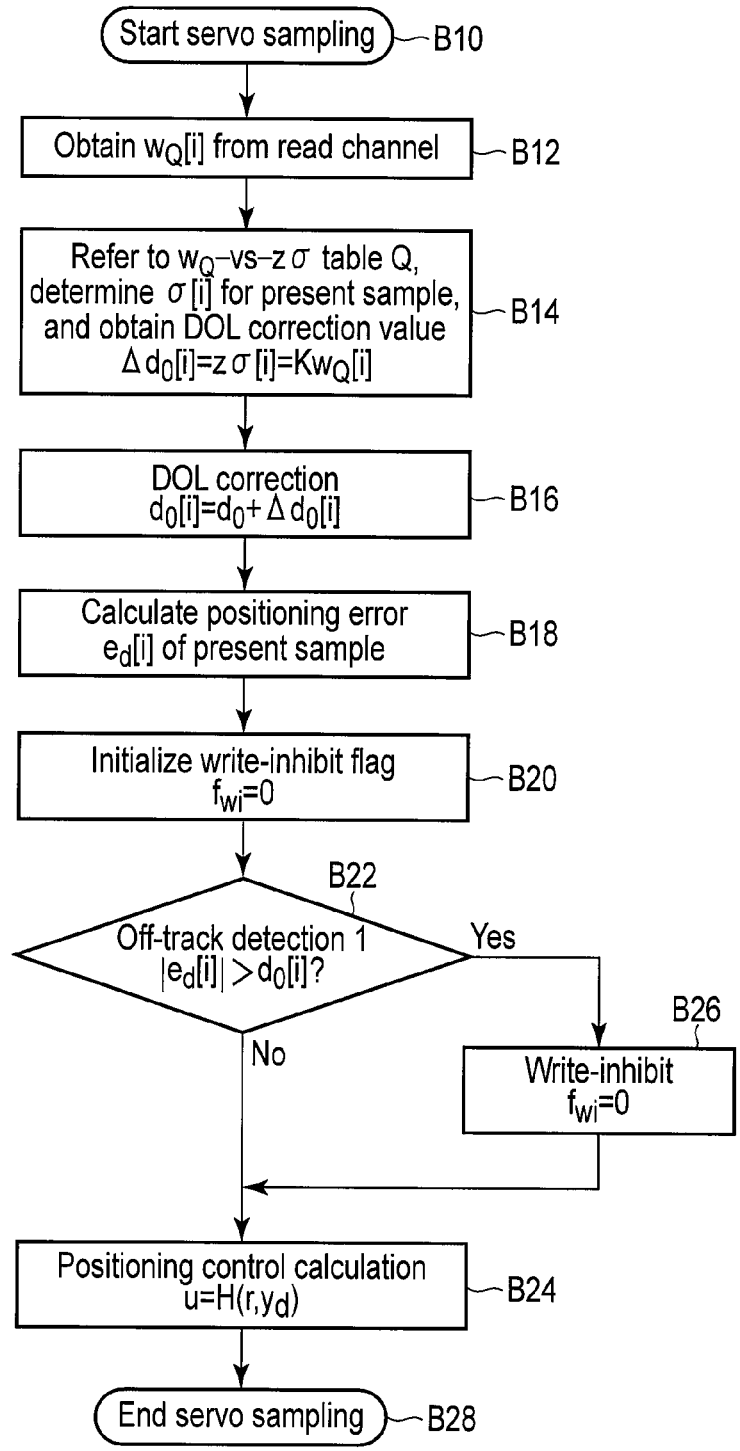
FIG. 10 is a flowchart showing operation of off-track detection and positioning control calculation according to a first embodiment.
Figure 11:
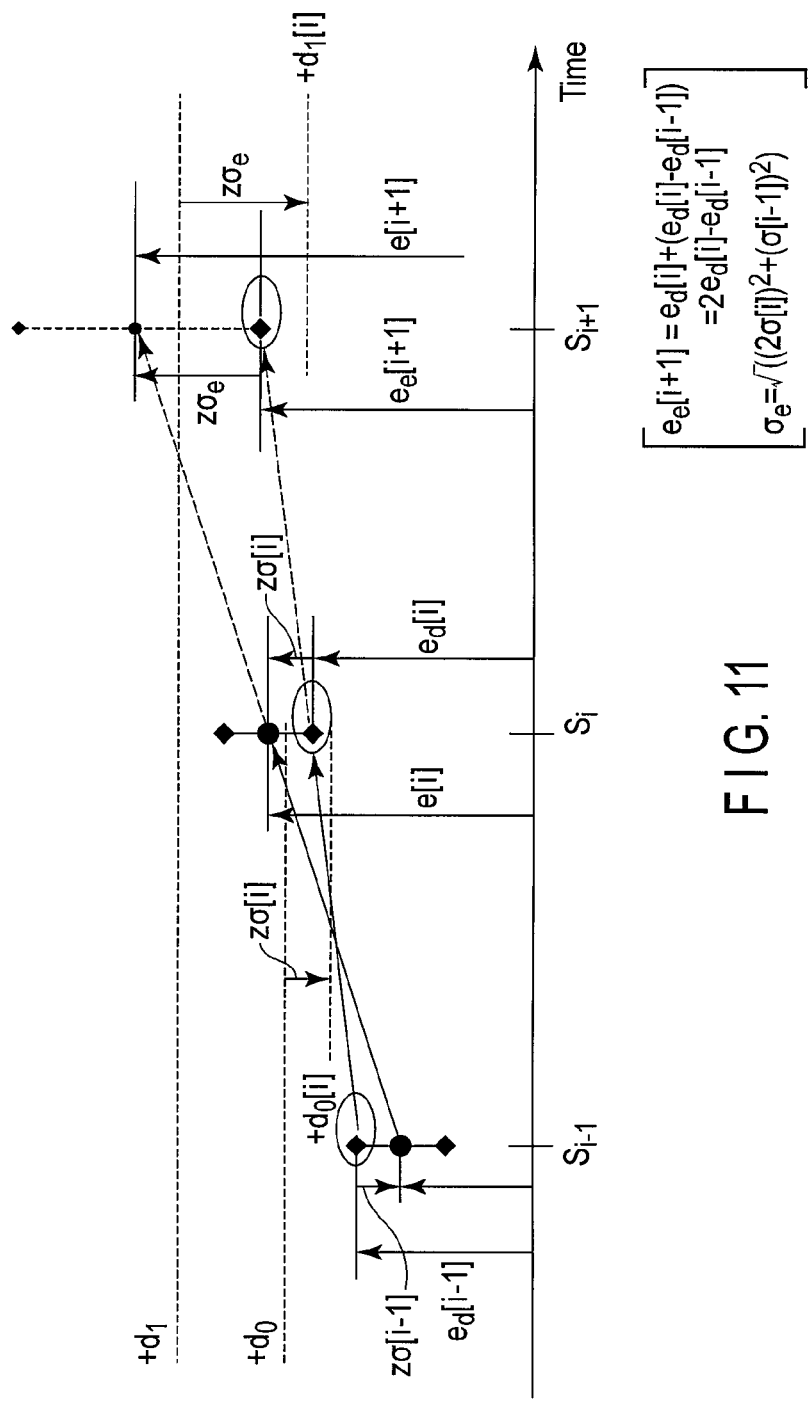
FIG. 11 is an explanatory diagram showing a change of a position error signal e[i] for explanation of relationship of a DOL correction value $d_0[i]$ to a detected positioning error and of a correction DOL value $d_1[i]$ to an estimated positioning error according to the first embodiment and a second embodiment.

With reference to FIG. 10 and FIG. 11, the positioning control including write-inhibit processing according to a first embodiment will be described.

In the first embodiment, if an estimated maximum detection error is represented as $z\sigma[i]$ when the probability of a detection positioning error $e_d[i]$ for a real positioning error e[i] is variance $\sigma[i]^2$, provided that an off-track condition is detected from a positioning error with a DOL value $d_0[i]$ ($d_0[i] = d_0 - z\sigma[i]$), off-track detection omission due to demodulation noise can be prevented by the detection. More specifically, as shown in FIG. 10, a position error signal is observed at sampling timings $S_{i-1}$ and $S_i$. Let us assume that at the timing $S_{i-1}$, a positioning error of a head real position for a target position is a point represented by a black dot, i.e., e[i−1]. At this time, an observed position error includes demodulation noise $w_n$ (maximum value $z\sigma[i−1]$), and thus, a demodulated value is obtained in the range indicated with rhombuses. For example, if a demodulated value $e_d[i−1]$ is obtained, a real position exists within the range of $e_d[i−1] \pm z\sigma[i−1]$. Similarly, if a demodulated value $e_d[i]$ is obtained at the sampling timing $S_i$, a real position e[i] exists within the range of $e_d[i] \pm z\sigma[i]$. Here, because $e_d[i] + z\sigma[i]$ exceeds a threshold $+d_0$, a real position may be in an off-track condition. Thus, an excess of a demodulated value $e_d[i]$ is evaluated by using a new threshold $+d_0[i]$ obtained by deducting a demodulation noise component zσ[S₁] from a threshold +d₀, and if a real position may be in an off-track condition, a write-inhibit flag $f_{wi}$ is output.

FIG. 10 shows processing during which a write-inhibit flag $f_{wi}$ is output. As shown in FIG. 10, the processing is started when a servo sample is obtained at a certain sampling time $S_i$ (block B10). In response to the obtainment of a servo sample, a signal quality monitor value $w_Q[i]$ is calculated on the basis of a gain read from the read channel 12R (block B12). Then, the conversion table X with which a standard deviation σ of demodulation noise for a signal quality monitor value $w_Q[i]$ is converted is referred to, and a standard deviation σ[i] of demodulation noise for a present servo sample is determined (block B14). Here, a DOL correction value Δd[i] as a threshold correction value is determined as a value obtained by multiplying a standard deviation σ[i] of demodulation noise by an estimated gain z as represented by the following equation (4):

$$\Delta d_0[i] = z\sigma[i] = K \cdot w_Q \quad (4).$$

As is clear from the equation (4), a DOL correction value Δd[i] is given as a value obtained by multiplying a signal quality monitor value $w_Q$ by a proportionality constant K.

Then, in the correction-value calculator Q, a correction DOL value $d_0[i]$ is calculated by:

$$d_0[i] = d_0 + \Delta d_0[i], \quad (5)$$

and is determined as a threshold ±$d_0[i]$ (block B16).

In the head positioning control module 32, a demodulated positioning error $e_d[i]$ of a present servo sample sampled at the present sampling timing $S_i$ is calculated (block B18). Also, the off-track detection module 36 is initialized. Here, if a write-inhibit flag $f_{wi}$ is output, the write-inhibit flag $f_{wi}$ is cleared by initialization of the off-track detection module 36 (block B20). Then, a demodulated positioning error $e_d[i]$ is input to the correction-value calculator Q and is compared with a threshold ±$d_0[i]$ (block B22). Here, a real position e[i] indicating an actual position of the head 10 exists within the range of ($e_d[i] \pm z\sigma[i]$) with respect to a demodulated positioning error $e_d[i]$. If a demodulated positioning error $e_d[i]$ is less than a threshold ±$d_0[i]$, it is not considered as an off-track condition, and in the positioning control module 32, a control amount u is determined on the basis of a demodulated positioning error $e_d[i]$ and is given to the positioning mechanism 6, and a head position is controlled (block B24). On the other hand, if a demodulated positioning error $e_d[i]$ is greater than a threshold ±$d_0[i]$, it is considered that an off-track condition has been detected, and a write-inhibit signal $f_{wi}$ is output to the write channel 12W, and writing by the write head 10W is inhibited (block B26). Then, in the positioning control module 32, a control amount u is determined on the basis of a demodulated positioning error $e_d[i]$ and is given to the positioning mechanism 6, and a head position is controlled (block B24). By a series of processes of the blocks B10 to B24, the processing for a certain servo sample is ended, preparing for processing for the next servo sample (block B28).

Figure 12:
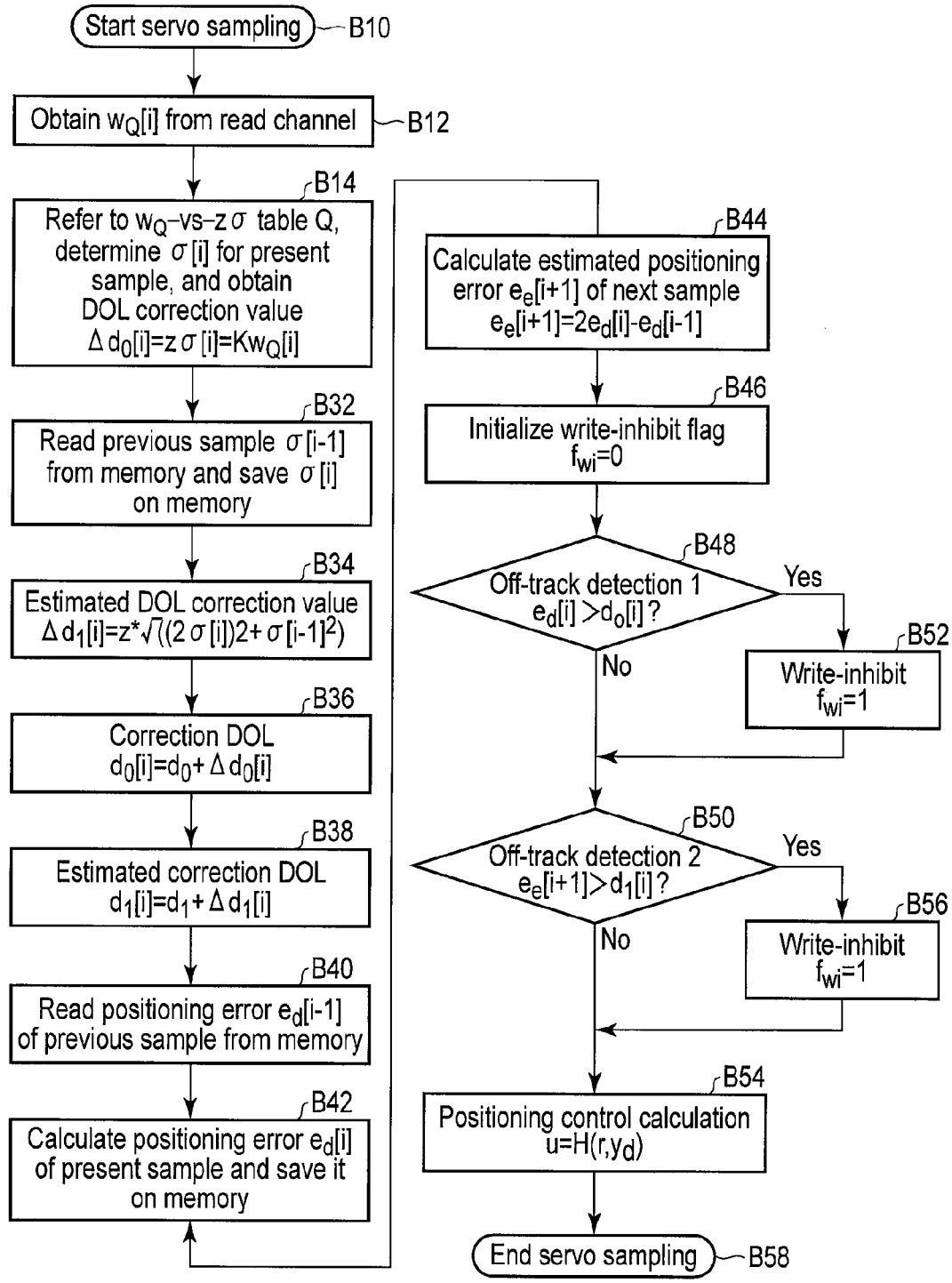
FIG. 12 is a flowchart showing operation of off-track detection and positioning control calculation according to the second embodiment.

With reference to FIG. 11 and FIG. 12, the positioning control including write-inhibit processing according to a second embodiment will be described.

In the first embodiment, if an off-track amount has a rate in an increasing direction at the sampling timing $S_i$, a positioning error $e_d[i]$ does not exceed a threshold +$d_0[i]$ and a write-inhibit flag $f_{wi}$ is not output, and if a recording operation is continued, before an off-track condition is detected at the next sampling timing $S_{i+1}$ and a write-inhibit $f_{wi}$ is output, a magnetic head position goes off track and data in an adjacent track may be destroyed. Thus, in the second embodiment, at the sampling timing $S_i$, an estimated positioning error $e_e[i+1]$ at the next sampling timing $S_{i+1}$ is determined, and an excess from a second threshold +$d_1[i]$ is evaluated. Here, in the second embodiment, when the probabilities of a detection positioning error $e_d[i-1]$ and $e_d[i]$ are variance σ[i-1]² and σ[i]², the probability of an estimated positioning error $e_e$ is represented by variance $\sigma e^2$ ($\sigma e^2 = (2\sigma[i])^2 + (\sigma[i-1])^2$), and if an estimated greatest detection error is represented by $z\sigma_e$, a detection omission due to demodulation noise $w_n$ can be prevented by detecting an estimated position with a DOL value $d_1[i]$ ($d_1[i] = d_1 - z\sigma_e$). More specifically, if real positions e[i-1] and e[i] at the samples $S_{i-1}$ and $S_i$ are already known, an estimated position e[i+1] at the sample $S_{i+1}$ can be determined by e[i+1]=e[i]+(e[i]-e[i-1])=2e[i]-e[i-1]. However, actually, because demodulated positioning errors $e_d[i-1]$ and $e_d[i]$ at the samples $S_{i-1}$ and $S_i$ include demodulation noise for real positioning errors e[i-1] and e[i], the probability of an estimated positioning error $e_e[i+1]=2e_d[i]-e_d[i-1]$ has variance $\sigma_e^2 = (2\sigma[i])^2 + (\sigma[i-1])^2$. Thus, an excess from a value of an estimated positioning error $e_e[i+1]$ is evaluated by using $d_1[i] = d_1 - z\sigma_e$ obtained by correcting a second threshold +$d_1$ with $z\sigma_e$. In FIG. 11, an estimated positioning error $e_e[i+1]$ obtained from demodulated positioning errors $e_d[i-1]$ and $e_d[i]$ at the sampling timing $S_{i+1}$ does not exceed a second threshold +$d_1$, but exceeds a threshold +$d_1[i]$ corrected with $z\sigma_e$. Thus, a write-inhibit flag $f_{wi}$ begins to be output from the off-track detection module 36 at the sampling timing $S_i$.

FIG. 12 shows processing during which a write-inhibit flag $f_{wi}$ begins to be output at the sampling timing $S_i$. In this processing, a certain servo sample is obtained at a certain sampling timing $S_{i-1}$, the conversion table X is referred to, and a standard deviation σ[i-1] of demodulation noise $w_n[i-1]$ for the servo sample is determined and is in the state of being stored in a memory (not shown in the figures). Then, the processing is started, and a servo sample is obtained at the next sampling timing $S_i$ (block B10). In response to the obtainment of a servo sample, a signal quality monitor value $w_Q[i]$ is calculated on the basis of a gain read from the read channel 12R (block B12). Then, the conversion table X, with which a standard deviation σ[i] of demodulation noise $w_n[i]$ for a signal quality monitor value $w_Q[i]$ is converted is referred to, and a standard deviation σ[i] of demodulation noise for a present servo sample is determined (block B14). Here, a DOL correction value Δd[i] is given as a value obtained by multiplying a standard deviation σ[i] of demodulation noise by an estimated gain z as represented by the following equation (4), and also, is given as a value obtained by multiplying a signal quality monitor value $w_Q$ by a proportionality constant K.

A standard deviation σ[i-1] of demodulation noise in the previous sample stored in the memory is read, and a standard deviation σ[i] of demodulation noise in the present sample is stored in the memory (block B32).

Next, an estimated DOL correction value $\Delta d_1[i]$ corresponding to a threshold correction value at an estimated position at the sampling timing $S_i$ is determined by calculation in the signal quality monitoring module 33 from standard deviations σ[i] and σ[i-1] of demodulation noise and an estimated gain z by using the following equation (6) (block B34):

$$\Delta d_1[i] = z\{(2\sigma[i])^2 + (\sigma[i-1])^2\}^{1/2}. \quad (6)$$

Also, in the correction-value calculator Q, a correction DOL value $d_0[i]$ at the sampling timing $S_i$ is calculated by the above-described equation:

$$d_0[i] = d_0 + \Delta d_0[i], \quad (5)$$

and a DOL value $d_0[i]$ is determined as a threshold $\pm d_0[i]$ (block B36).

Similarly, in the correction-value calculator Q, an estimated correction DOL value $d_1[i]$ at the sampling timing $S_i$ is calculated by:

$$d_1[i]=d_1+\Delta d_1[i], \tag{7}$$

and is determined as an estimated threshold $\pm d_1[i]$ (block B38).

A demodulated positioning error $e_d[i-1]$ of the previous servo sample sampled at the previous sampling timing $S_{i-1}$ is read in advance from the memory (block B40). Then, in the head positioning control module 32, a demodulated positioning error $e_d[i]$ of the present servo sample sampled at the present sampling timing $S_i$ is calculated and is stored in the memory (block B42).

Next, an estimated positioning error $e_e[i+1]$ to be sampled at the next sampling timing $S_{i+1}$ is calculated from the demodulated positioning error $e_d[i-1]$ of the previous servo sample and the demodulated positioning error $e_d[i]$ of the present servo sample in the head positioning control module 32 on the basis of the following equation (8) (block B44):

$$e_e[i+1]=2e_d[i]-e_d[i-1] \tag{8}$$

Then, the off-track detection module 36 is initialized. Here, if a write-inhibit flag $f_{wi}$ is output, the write-inhibit flag $f_{wi}$ is cleared by initialization of the off-track detection module 36 (block B46). Next, the demodulated positioning error $e_d[i]$ is input to the correction-value calculator Q, and is compared with a threshold $\pm d_0[i]$ (block B48). If the demodulated positioning error $e_d[i]$ is less than a threshold $\pm d_0[i]$, it is not considered as an off-track condition. On the other hand, if the demodulated positioning error $e_d[i]$ is greater than a threshold $\pm d_0[i]$, it is considered that an off-track condition has been detected, a write-inhibit signal $f_{wi}$ is output to the write channel 12W, and writing by the write head 10W is inhibited (block B52). Next, the estimated positioning error $e_e[i+1]$ is input to the correction-value calculator Q, and is compared with a threshold $\pm d_1[i]$ (block B50). If the estimated positioning error $e_e[i+1]$ is less than a threshold $\pm d_1[i]$, it is not considered as an off-track condition, and in the positioning control module 32, a control amount u is determined on the basis of the demodulated positioning error $e_d[i]$ and is given to the positioning mechanism 6, and a head position is controlled (block B54). On the other hand, if the estimated positioning error $e_e[i+1]$ is greater than the threshold $\pm d_1[i]$, it is considered that an off-track condition has been detected, a write-inhibit signal $f_{wi}$ is output to the write channel 12W, and writing by the write head 10W is inhibited (block B56). Then, in the positioning control module 32, a control amount u is determined on the basis of the demodulated positioning error $e_d[i]$ and is given to the positioning mechanism 6, and a head position is controlled (block B54). By a series of processes of the blocks B10 to B14 and the blocks B32 to B58, the processing for a certain servo sample timing is ended, preparing for processing for the next servo sample (block B58).

As described above, in off-track detection of the magnetic disk apparatus according to the embodiment, (1) because an off-track threshold can be corrected in accordance with a demodulation noise amount, even if a position error signal includes demodulation noise, a situation in which writing cannot be inhibited although a real position error exceeds the off-track threshold can be prevented, and (2) because a second off-track threshold depending on an estimated position can be corrected in accordance with a demodulation noise amount, even if a position error signal includes demodulation noise, a situation in which writing cannot be inhibited although an estimated value of the next sample value determined from a real position exceeds the second off-track threshold can be prevented.

According to the embodiment, off-track detection according to a servo signal quality is realized, detection omission of off-track detection can be prevented, and a disk storage apparatus with a higher reliability can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk drive apparatus, comprising:
a disk having a disk surface;
a head movable over the disk surface to write data on the disk;
a head positioning mechanism configured to control a position of the head over the disk surface; and
a controller configured to determine a demodulated positioning error from a demodulated position and a target position to control the head positioning mechanism, the demodulated position being obtained by demodulating a servo signal readout from the disk, wherein the controller is configured to:
estimate a demodulation noise amount included in the demodulated position on the basis of a signal quality of the servo signal;
correct a predetermined off-track threshold with a correction value which is obtained from the estimated demodulation noise amount; and
inhibit a write operation of writing data on the disk, if the demodulated positioning error exceeds the corrected off-track threshold.

2. The disk drive apparatus of claim 1, wherein the controller is further configured to obtain a demodulation error as the correction value from variance of the demodulated positioning error, and subtract the demodulation error from the predetermined off-track threshold to obtain the corrected off-track threshold.

3. The disk drive apparatus of claim 1, further comprising a gain adjuster configured to adjust a level of the servo signal with a certain gain, wherein signal quality of the servo signal is calculated from the gain which is adjusted by the gain adjuster.

4. The disk drive apparatus of claim 1, wherein the estimating the demodulation noise amount includes:
preparing a table in which a demodulation noise amount for each head/zone is described, the demodulation noise amount having a correlation with the signal quality and being measured in advance from the servo signal readout for each head/zone on the disk; and
referring a demodulation noise amount from the table in accordance with a zone on the disk, where the head is positioned.

5. A disk drive apparatus, comprising:
a disk having a disk surface;
a head movable over the disk surface to write data on the disk;
a head positioning mechanism configured to control a position of the head over the disk surface; and a controller configured to control the head positioning mechanism; wherein the controller is configured to:

determine discrete demodulated positioning errors from differences between discrete demodulated positions and a target position, the discrete demodulated positions being obtained by demodulating a servo signal read out from the disk with successively sampling, the discrete demodulated positioning errors including a previous demodulated positioning error sampled at a previous sampling timing and a present demodulated positioning error sampled at a present sampling timing;

estimate and calculate a next demodulated positioning error which is predicted to be obtained at a next sampling timing of the present sampling timing on the basis of the previous demodulated positioning error and the present demodulated positioning error; and estimate a demodulation noise amount which is included in the demodulated position at the next sampling timing on the basis of a signal quality of the servo signal;

correct an off-track threshold with a correction value which is obtained from the estimated demodulation noise amount; and inhibit a write operation of writing data on the disk, if the next demodulated positioning error which is estimated and calculated is expected to exceed the corrected off-track threshold.

6. The disk drive apparatus of claim 5, wherein the next demodulated positioning error is estimated and calculated on the basis of a difference between the previous demodulated positioning error and the present demodulated positioning error.

7. The disk drive apparatus of claim 5, wherein the controller is further configured to obtain a demodulation error from variance of the previous demodulated positioning error and variance of the present demodulated positioning error, and subtract the demodulation error from the off-track threshold to obtain the corrected off-track threshold.

8. An off-track detection method of a disk drive apparatus comprising a disk having a disk surface, a head movable over the disk surface to write data on the disk, and a head positioning mechanism configured to control a position of the head over the disk surface, the method comprising:

determining a demodulated positioning error from a demodulated position and a target position to control a head positioning mechanism, the demodulated position being obtained by demodulating a servo signal redout from the disk, estimating a demodulation noise amount included in the demodulated position on the basis of a signal quality of a servo signal;

correcting a predetermined off-track threshold with a correction value which is obtained from the estimated demodulation noise amount; and inhibiting a write operation of writing data on the disk, if the demodulated positioning error exceeds the corrected off-track threshold.

9. The off-track detection method of claim 8, wherein the correcting the predetermined off-track threshold includes obtaining a demodulation error as the correction value from variance of the demodulated positioning error, and subtracting the demodulation error from the predetermined off-track threshold to obtain the corrected off-track threshold.

10. The off-track detection method of claim 8, wherein a level of the servo signal is adjusted with a certain gain; and a signal quality of the servo signal is calculated from the adjusted gain.

11. The off-track detection method of claim 8, wherein the estimating the demodulation noise amount includes:

preparing a table in which a demodulation noise amount for each head/zone is described, the demodulation noise amount having a correlation with the signal quality and being measured in advance from the servo signal readout for each head/zone on the disk; and referring a demodulation noise amount from the table in accordance with a zone on the disk, where the head is positioned.

12. An off-track detection method of a disk drive apparatus comprising a disk having a disk surface, a head movable over the disk surface to write data on the disk, and a head positioning mechanism configured to control a position of the head over the disk surface, the method comprising:

determining demodulated positioning errors from differences between discrete demodulated positions and a target position to control the head positioning mechanism, the discrete demodulated positions being obtained by demodulating a servo signal read out from the disk with successively sampling, the discrete demodulated positioning errors including a previous demodulated positioning error sampled at a previous sampling timing and a present demodulated positioning error sampled at a present sampling timing estimating and calculating a next demodulated positioning error which is predicted to be obtained at a next sampling timing of the present sampling timing on the basis of the previous demodulated positioning error and the present demodulated positioning error, and estimating a demodulation noise amount which is included in the demodulated position at the next sampling timing on the basis of a signal quality of the servo signal;

correcting an off-track threshold with a correction value which is obtained from the estimated demodulation noise amount; and inhibiting a write operation of writing data on the disk, if the next demodulated positioning error which is estimated and calculated is expected to exceed the corrected off-track threshold.

13. The off-track detection method of claim 12, wherein the next demodulated positioning error is estimated and calculated on the basis of a difference between the previous demodulated positioning error and the present demodulated positioning error.

14. The off-track detection method of claim 12, wherein the correcting includes obtaining a demodulation error from variance of the previous demodulated positioning error and variance of the present demodulated positioning error, and subtracting the demodulation error from the predetermined off-track threshold to obtain the corrected off-track threshold.

* * * * *